(12) United States Patent
Miyazato et al.

(10) Patent No.: US 12,098,842 B2
(45) Date of Patent: Sep. 24, 2024

(54) STEAM GENERATION APPARATUS

(71) Applicants: Yoshiaki Miyazato, Tokyo (JP); WINSTAR DEVELOPMENT GROUP, Tokyo (JP); THE BIZSER CO., LTD., Tokyo (JP)

(72) Inventors: Yoshiaki Miyazato, Tokyo (JP); Dae Ki Park, Tokyo (JP); Young Kwon Kim, Tokyo (JP)

(73) Assignees: Yoshiaki MIYAZATO, Tokyo (JP); WINSTAR DEVELOPMENT GROUP, Tokoyo (JP); THE BIZSER CO., LTD., Tokyo (JP)

( * ) Notice: Subject to any disclaimer, the term of this patent is extended or adjusted under 35 U.S.C. 154(b) by 379 days.

(21) Appl. No.: 17/761,413

(22) PCT Filed: Sep. 30, 2019

(86) PCT No.: PCT/JP2019/038476
§ 371 (c)(1),
(2) Date: Mar. 17, 2022

(87) PCT Pub. No.: WO2021/064780
PCT Pub. Date: Apr. 8, 2021

(65) Prior Publication Data
US 2022/0364721 A1 Nov. 17, 2022

(51) Int. Cl.
F22B 27/16 (2006.01)
C02F 1/12 (2023.01)
C02F 103/08 (2006.01)

(52) U.S. Cl.
CPC ............. *F22B 27/165* (2013.01); *C02F 1/12* (2013.01); *C02F 2103/08* (2013.01)

(58) Field of Classification Search
CPC ........ F22B 27/165; F22B 27/00; F22B 27/16; F22B 1/28; C02F 1/06; C02F 1/12; C02F 2103/08
See application file for complete search history.

(56) References Cited

U.S. PATENT DOCUMENTS 4,271,791 A * 6/1981 Kime ..................... F22B 27/00
122/487
6,157,774 A 12/2000 Komino et al.
(Continued)

FOREIGN PATENT DOCUMENTS

CN 107289429 A * 10/2017
JP 57-167779 A 10/1982
(Continued)

OTHER PUBLICATIONS

International Search Report of PCT/JP2019/038476 dated Dec. 24, 2019 [PCT/ISA/210].

*Primary Examiner* — Gregory A Wilson
(74) *Attorney, Agent, or Firm* — Sughrue Mion, PLLC

(57) ABSTRACT

Steam generation apparatus and method in which liquid is regulated in thermal catalytic reaction below a specific temperature and accelerated in thermal catalytic reaction above that temperature, including a vaporizer housing, axial ends of the housing being opened, and collars formed at axial ends of a cylindrical part of the housing; upper and lower flanges joined to housing collars; a vaporizer with a spiral channel in between; an exothermic member disposed such that the vaporizer inside is heated to a predetermined temperature; an injection nozzle at a center of the upper flange with an intake for liquid to be treated; a steam socket attached to the lower flange for guiding steam to the spiral channel, the steam socket including an inlet port connected to an inside of the vaporizer, outlet port connected to the
(Continued)

spiral channel, and a steam channel connecting the inlet port and the outlet port.

6 Claims, 7 Drawing Sheets

(56) References Cited

U.S. PATENT DOCUMENTS

| | | | |
|---|---|---|---|
| 9,516,986 B1 * | 12/2016 | Williams | F22B 1/28 |
| 11,149,940 B2 * | 10/2021 | Naterer | B01D 1/0058 |
| 11,476,480 B2 * | 10/2022 | Dobek | H01M 8/04373 |
| 11,815,261 B2 * | 11/2023 | Alvarez | F22B 1/287 |
| 2007/0223894 A1 | 9/2007 | Cheung | |
| 2011/0280553 A1 | 11/2011 | Hsu et al. | |
| 2022/0364721 A1 * | 11/2022 | Miyazato | B01D 1/30 |

FOREIGN PATENT DOCUMENTS

| | | |
|---|---|---|
| JP | 11-28349 A | 2/1999 |
| JP | 2008-527283 A | 7/2008 |
| JP | 2018-34155 A | 3/2018 |
| KR | 10-0749223 B1 | 8/2007 |
| WO | 2004/020066 A1 | 3/2004 |

* cited by examiner

STEAM GENERATION APPARATUS

CROSS REFERENCE TO RELATED APPLICATIONS

This application is a National Stage of International Application No. PCT/JP2019/038476, filed Sep. 30, 2019.

TECHNICAL FIELD

The present invention relates to a steam generation apparatus.

BACKGROUND ART

To generate steam and hot water, it has traditionally been known to use a combustion method with petroleum, gas, electricity, or various renewable energies. Such a method suffers problems of a heat loss in the course of heating water and sources of environmental pollution produced in the course of combustion. There is a method for heating seawater to generate steam and extract fresh water from the steam for desalination of the seawater, and an evaporator for a seawater desalination facility based on multistage flashing is known as described in Patent Literature 1.

The evaporator for a seawater desalination facility described in Patent Literature 1, which is a multistage flashing evaporator, includes a flash chamber that is divided into 2 parts, a first diaphragm, and a second diaphragm that divides tube bundles into 2 parts, in which the second diaphragm is formed such that widths of the tube bundles on a side where vapor enters are larger than widths of the tube bundles on a side where vapor exits, which increases the number of stages to improve efficiency of the evaporator without increasing the size of the evaporator.

CITATION LIST

Patent Literature

Patent Literature 1: Korean Patent Registration Number 10-0749223

SUMMARY OF INVENTION

Technical Problem

The evaporator for a seawater desalination facility thus configured is not necessarily excellent in performance because it continues to heat seawater by using external energy constantly, and thus the problem is that a large amount of energy is consumed, which is not necessarily economically favorable.

Accordingly, an object of the present invention, which has been made to solve the above-described problems of prior arts, is to provide an apparatus and a steam generation method, with which fossil fuels are not burned and vapor is produced from a vaporizer by using seawater at ordinary temperature.

Another object of the present invention is to provide a steam generation apparatus that is excellent in thermal efficiency through a spiral groove formed in an outer wall of a vaporizer such that thermal insulation and heating within the vaporizer are achieved simultaneously.

Still another object of the present invention relates to a steam generation apparatus that provides steam and resultant fertilizer components such as mineral as by-products, and is to provide fertilizer components such that reactants generated in the course of vaporization can be used as fertilizers and soil improvers.

Solution to Problem

To solve the problems, a steam generation apparatus according to the present invention, in a steam generation apparatus, includes: a vaporizer housing including a cylindrical part having a predetermined diameter and length, axial opposite ends of the vaporizer housing being opened, and collars formed at axial opposite ends of the cylindrical part; an upper flange and a lower flange to be joined to respective one of the collars of the vaporizer housing; a vaporizer having a cylindrical shape with axial opposite ends being opened, the vaporizer being housed within the cylindrical part of the vaporizer housing with a spiral channel in between; at least one exothermic member disposed such that an inside of the vaporizer is heated to a predetermined temperature; an injection nozzle located at a center of the upper flange and including an intake for liquid to be treated and a solenoid valve; a steam socket that is a member attached to the lower flange for guiding steam produced in the vaporizer to the spiral channel, the steam socket including a steam inlet port connected to an inside of the vaporizer, a steam outlet port connected to the spiral channel, and a steam channel connecting the steam inlet port and the steam outlet port; and a wastewater discharge port passing through both the lower flange and the steam socket.

Preferably, in the steam generation apparatus according to the present invention, the spiral channel is a spiral groove formed in an outer wall of the vaporizer.

Preferably, in the steam generation apparatus according to the present invention, the spiral channel is a spiral groove formed in an inner wall of the vaporizer housing.

Preferably, in the steam generation apparatus according to the present invention, the spiral channel includes a spiral-shaped member such that the steam rises windingly along the vaporizer and flows out to an outside.

Preferably, in the steam generation apparatus according to the present invention, the liquid to be treated includes seawater and a thermal catalyzer.

Preferably, in the steam generation apparatus according to the present invention, inner and outer circumferential surfaces of the vaporizer and an inner circumferential surface of the vaporizer housing are subjected to surface treatment including a far infrared radiation paint.

The summary of invention described above is not intended to recite all necessary features of the present invention, and a subcombination of the features may fall within the invention.

Advantageous Effects of Invention

The steam generation apparatus according to the present invention is capable of generating steam constantly in a short time by using only a minimum external energy for preheating the vaporizer.

Further, in the steam generation apparatus according to the present invention, the steam is more easily generated because the steam is generated from the liquid to be treated, and in addition, the steam is generated with neither combustion of fuels such as chemical fuels nor reheating, so that an economically excellent steam generation apparatus without causing air pollution can be provided.

Further, the steam generation apparatus according to the present invention is capable of providing fertilizer components, which are reactants generated in the course of vaporization during steam production such as mineral, to be usable as fertilizer components and soil improvers.

DESCRIPTION OF EMBODIMENT

A preferable embodiment for implementing the present invention will now be described with reference to drawings. The embodiment described below is not intended to limit the invention according to claims nor all combination of features described in the embodiment is not necessarily essential for solution to problem for the invention.

Figure 1:
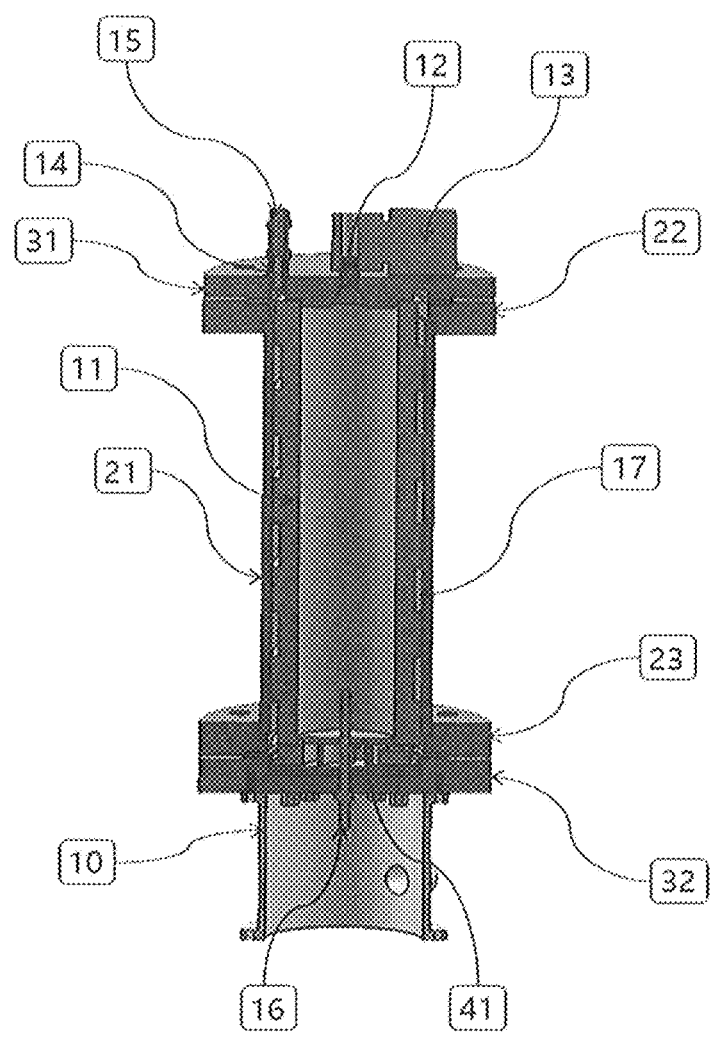
FIG. 1 is a sectional view schematically illustrating some of components of a steam generation apparatus including a base, a lower flange, a vaporizer, a steam socket, a vaporizer housing, a collar, an upper flange, an injection nozzle, a solenoid valve, an outlet port, and a check valve.
Figure 2:
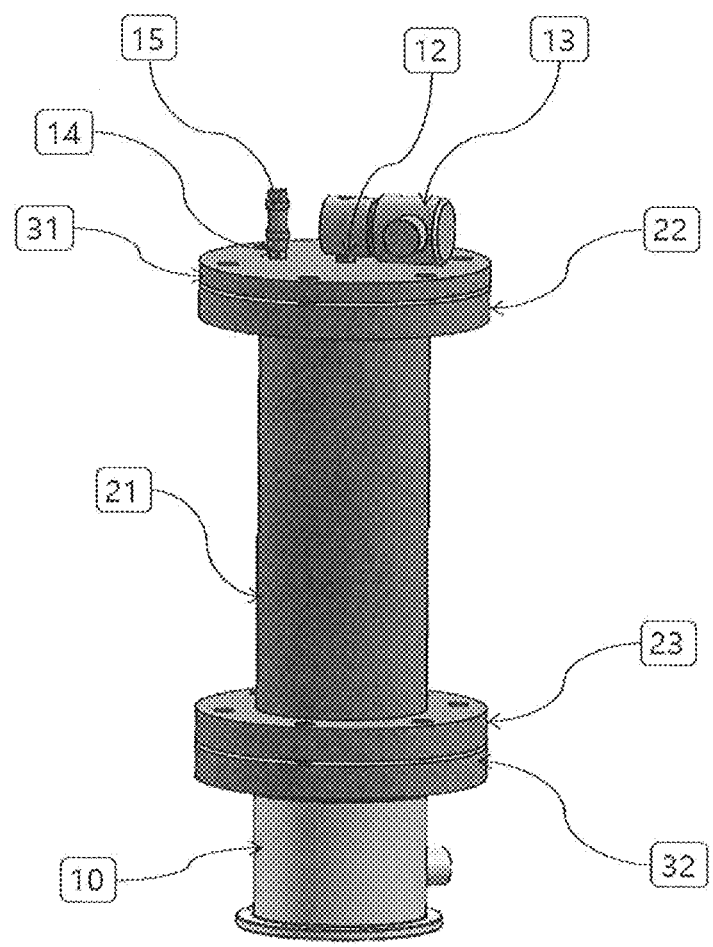
FIG. 2 is a perspective view schematically illustrating some of components of the steam generation apparatus according to an embodiment of the present invention.
Figure 3:
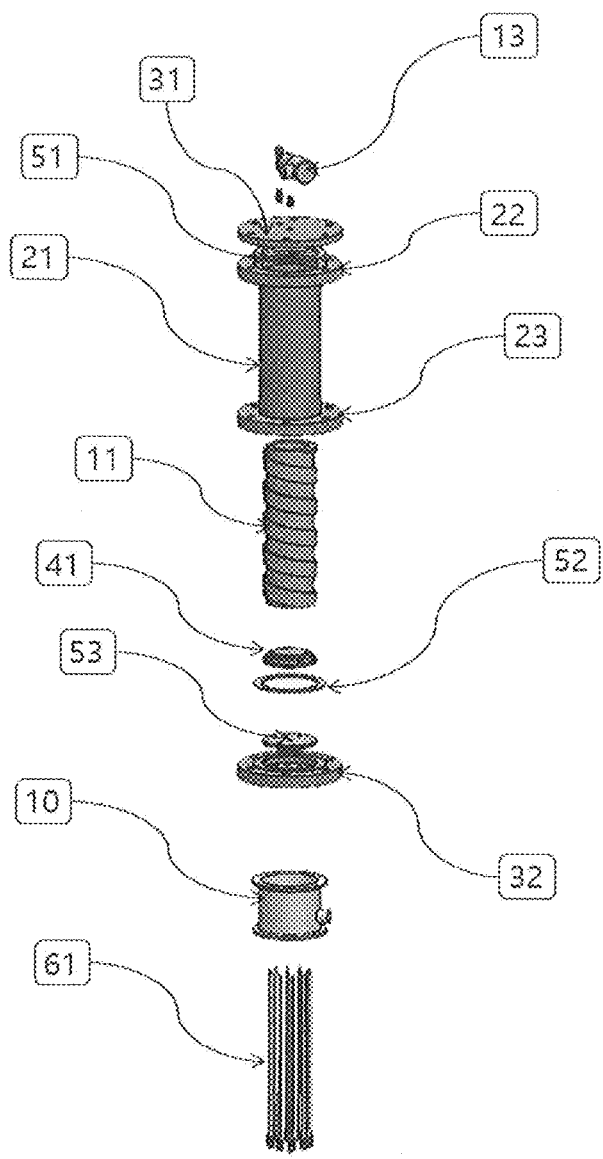
FIG. 3 is a perspective view of some of disassembled components, which are excerpted and enlarged, of the steam generation apparatus according to the embodiment of the present invention.
Figure 4:
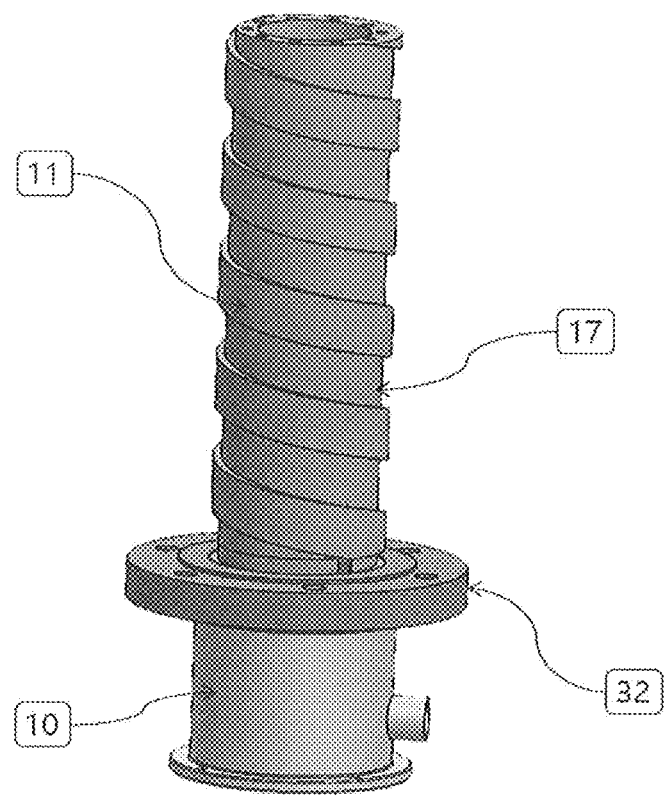
FIG. 4 is a perspective view of some of components, which are excerpted and enlarged, in a state in which a spiral groove is formed in the outer wall of the vaporizer.
Figure 5:
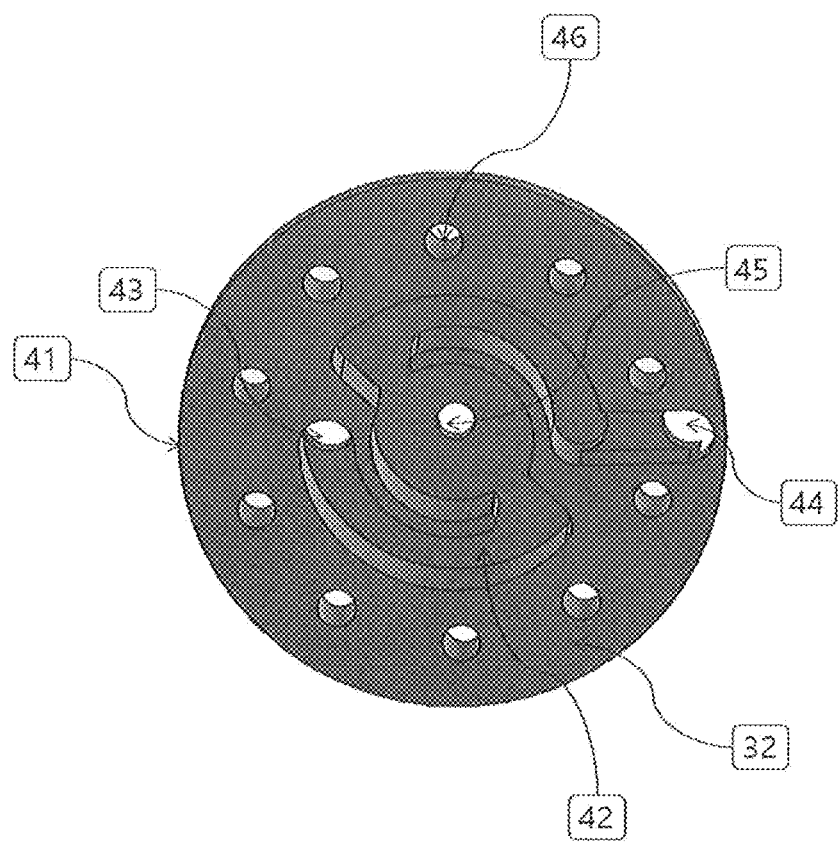
FIG. 5 is a perspective view of an excerpted and enlarged lower side of the steam socket.
Figure 6:
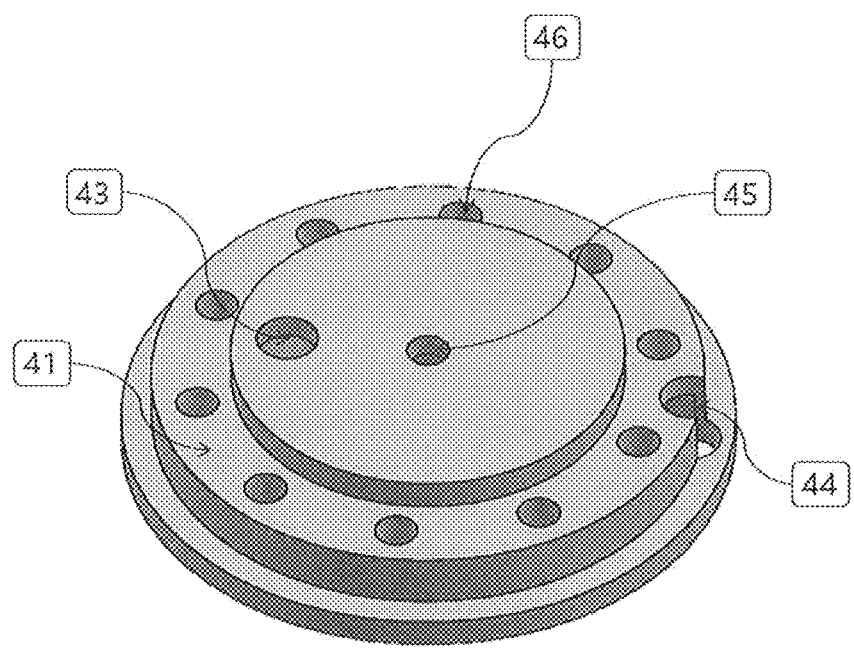
FIG. 6 is a perspective view of an excerpted and enlarged upper side of the steam socket.
Figure 7:
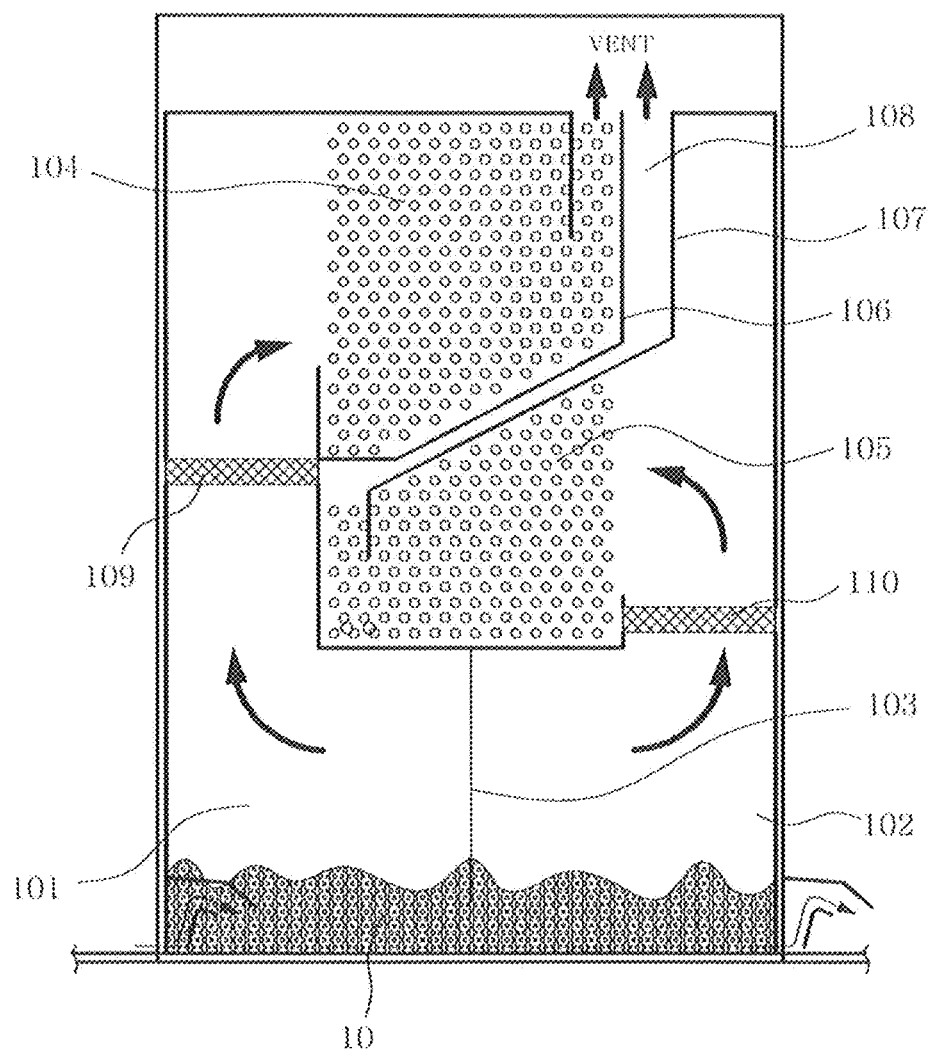
FIG. 7 is a sectional view for outlining a traditional evaporator for a seawater desalination facility based on multistage flashing.

FIG. 1 is a sectional view schematically illustrating some of components of a steam generation apparatus including a base, a lower flange, a vaporizer, a steam socket, a vaporizer housing, a collar, an upper flange, an injection nozzle, a solenoid valve, an outlet port, and a check valve; FIG. 2 is a perspective view schematically illustrating some of components of the steam generation apparatus according to an embodiment of the present invention; FIG. 3 is a perspective view of some of disassembled components, which are excerpted and enlarged, of the steam generation apparatus according to the embodiment of the present invention; FIG. 4 is a perspective view of some of components, which are excerpted and enlarged, in a state in which a spiral groove is formed in the outer wall of the vaporizer; FIG. 5 is a perspective view of an excerpted and enlarged lower side of the steam socket; FIG. 6 is a perspective view of an excerpted and enlarged upper side of the steam socket; and FIG. 7 is a sectional view for outlining a traditional evaporator for a seawater desalination facility based on multistage flashing.

As illustrated in FIGS. 1 and 2, in the steam generation apparatus according to the embodiment, a lower flange 32 is fixed to a base 10, and a gasket, which is not illustrated, a steam socket 41, vaporizer 11, and a collar 23 on the lower side of a vaporizer housing 21 are fixed to the lower flange 32 thus fixed, such that they are kept airtight from the outside. A gasket, which is not illustrated, and an upper flange 31 are fixedly joined to a collar 22 on the upper side of the vaporizer housing such that they are kept airtight from the outside, and an outlet port 14 with a check valve 15 and an injection nozzle 12 with a solenoid valve 13 are fixed to the upper flange 31 thus fixed.

As illustrated in FIG. 3, the steam generation apparatus according to the embodiment includes a heater 61 serving as an exothermic member, the base 10, the lower flange 32, gaskets 51, 52, and 53, the steam socket 41, the vaporizer 11, the vaporizer housing 21 having the collars 22, 23 formed thereon, the upper flange 31, and the solenoid valve 13. The heater 61 is inserted in a wall portion of the vaporizer 11 through the steam socket 41.

As illustrated in FIG. 4, a spiral groove 17 serving as a spiral channel is formed in the outer wall of the vaporizer 11 for allowing steam to flow out windingly around the vaporizer 11 such that the temperature in the vaporizer 11 is prevented from lowering and a set temperature is maintained.

As illustrated in FIGS. 5 and 6, the steam socket 41 has a steam channel 42, a steam inlet port 43, a steam outlet port 44, wastewater discharge port 45, and a heater fixture 46 formed therein, and the steam inlet port 43 and the wastewater discharge port 45 are in communication with the inside of the vaporizer 11 and the steam outlet port 44 is in communication with the spiral groove 17 formed in the outer wall of the vaporizer 11. Further, the steam inlet port 43 and the steam outlet port 44 are continuous with each other via a steam channel 42, and the wastewater discharge port 45 is formed substantially at the center portion of the steam channel 42.

To be more specific with reference to the drawings illustrated according to the present invention: as illustrated in FIG. 1, the steam generation apparatus according to the embodiment includes the vaporizer 11 of a cylindrical shape with a predetermined diameter and length, the upper portion and the lower portion on axial opposite ends of the vaporizer 11 being opened; the spiral groove 17 is formed in the cylindrical outer wall of the vaporizer as illustrated in FIG. 4; and as illustrated in FIGS. 5 and 6, the steam socket 41, which has the steam channel 42, the steam inlet port 43, and the steam outlet port 44 formed therein, is fixedly joined to the lower portion of the vaporizer 11, and the vaporizer 11 is kept airtight by the vaporizer housing 21 and the gasket 51, 52, and 53 attached to the flanges 31, 32. A steam discharge channel is formed through which vaporized liquid to be treated (not illustrated) is discharged, so that steam generation is made continuous, and the heater 61 is included in the configuration for heating the inside of the vaporizer to allow steam to be discharged along the steam flow channel.

The liquid to be treated according to the embodiment is a water-soluble material that is composed of seawater and a mixture of organic/inorganic salts, a thermal catalyzer and a thermal stabilizer and that is desirably configured such that thermal stability is maintained below a predetermined set temperature and vaporization is promoted above the set temperature and therefore configured such that selective vaporization is achieved depending on temperature; although in a configuration, the seawater and the organic/inorganic salts and the thermal catalyzer may be injected simultaneously to the inside of the vaporizer 11 for producing steam.

The vaporizer 11 of the steam generation apparatus according to the embodiment is desirably made of a material tolerant to the corrosion acceleration nature of seawater and high temperature.

Further, the heater 61 of the steam generation apparatus according to the embodiment is desirably made of a material that is both tolerant to the corrosion acceleration nature of seawater and excellent in the conduction of heat. The heater 61 is preferably controlled by a temperature control device, which is not illustrated, and is desirably configured such that, when the temperature inside the vaporizer 11 reaches a set temperature, power supply to the heater 61 is disconnected.

To be more specific as an example of the steam generation apparatus according to the embodiment, once the heater 61 of the steam generation apparatus according to the embodiment is supplied with power and the inside of the vaporizer 11 reaches a set temperature, for example 120° C., the power supply to the heater 61 is disconnected by a control unit, which is not illustrated. Simultaneously, the solenoid valve 13 is supplied with power and the liquid to be treated is injected at high pressure into the vaporizer 11 by the solenoid valve 13 and the injection nozzle 12.

Consequently, the injected liquid to be treated is self-heated and vaporized by thermal catalytic reaction in the vaporizer 11 preheated by the heater 61 to generate steam. In this way, the self-heated and vaporized steam by the thermal catalysis flows into the steam inlet port 43 of the steam socket 41 and flows out from the steam outlet port 44 through the steam channel 42, and the flowing-out steam rises windingly around the outer wall of the vaporizer 11 through the spiral groove 17 while heating and the thermal insulation of the vaporizer is maintained such that the set temperature of the vaporizer 11 is maintained.

Preferably, a desirable composition of the liquid to be treated according to the embodiment includes 30% or more of seawater, 30% or more of organic/inorganic salts compounds, hydrogen peroxide, a thermal catalyzes, and a thermal stabilizer.

For a suitable configuration of the vaporizer according to the embodiment, it is preferable when made of SUS316 material that has excellent corrosion resistance and it is preferable that surfaces within the vaporizer are subjected to surface treatment including a far infrared radiation paint. The far infrared radiation paint promotes vaporization of the liquid to be treated and increases thermal conductivity by a coating with a coating agent composed of a far infrared radiation composition including 20 to 30 mass % olivine of a far infrared radioactive filler, 30 to 40 mass % binder, 10 to 20 mass % solvent agent, and 20 to 30 mass % hardener to form a highly efficient vaporizer.

As used herein, "coating" refers to an intended material being attached on a surface of an object to use such that a property other than a property unique to the object is included, and for the purpose of the present invention, is composed such that a coated material further includes a far infrared radiative property.

It is desirable for the far infrared radiation paint used for the steam generation apparatus according to the embodiment to include 20 to 30 mass % olivine, which is a far infrared radiative agent, relative to a total mass, and when less than 20 mass % or more than 30 mass % olivine is included, it is not desirable because an intended far infrared radiation efficiency cannot be exhibited. Further, a binder contained in the far infrared radiation paint according to the embodiment is desirably contained 30 to 40 mass % for the coating agent total mass, and when the content of the binder is less than 30 mass %, the effect of an intended level of sufficient thermal conductivity cannot be produced, and when the content is more than 40 mass %, the effect of further improvement of the thermal conductivity is less likely to be expected and a problem may arise in terms of economy, both of which are not desirable.

Further, the binder contained in the far infrared radiation paint used for the steam generation apparatus according to the embodiment is preferably composed of silica or alumina, and desirably, it is desirably composed of silica because the use of silica can contribute to the increase of the thermal conductivity. However, the composition of the binder is not limited thereto and may be composed of and include any and all compositions that can increase the thermal conductivity.

Preferably, the size of a particle of silica contained in the far infrared radiition paint used for the steam generation apparatus according to the embodiment is 20 to 50 nm, although it is not limited thereto. It is not desirable when the particle of silica is formed to be less than 20 nm or more than 50 nm in size because penetration occurs even in micropores in a metal coating surface, so that a high bonding strength with the coating surface cannot be provided and there is a risk that removal may occur easily by an external impact.

Further, the silica particles contained in the far infrared radiation paint used for the steam generation apparatus according to the embodiment may be in a form of being dissolved in water, and then the form of being dissolved in water is desirably such that the solid content is 20 to 40 mass % for properly controlling viscosity, although it is not limited thereto.

A solvent contained in the far infrared radiation paint used for the steam generation apparatus according to the embodiment is desirably contained 10 to 20 mass % for the coating agent total mass, and when less than 10 mass % or more than 20 mass % solvent is contained, it is not a desirable composition because compositions of the coating agent may insufficiently be mixed or desired physical properties may not be obtained.

Further, a composition of the solvent contained in the far infrared radiation paint used for the steam generation apparatus according to the embodiment is desirably composed of one or more selected from ethyl alcohol, methyl alcohol, isopropyl alcohol, and benzyl alcohol, although it is not necessarily limited thereto.

The hardener contained in the far infrared radiation paint used for the steam generation apparatus according to the embodiment desirably contains 20 to 30 mass % hardener for the total mass of coating agent compositions, and when the content of the hardener is less than 20 mass %, a sufficient hardening effect cannot be produced and when it is more than 30 mass %, physical properties of coating compositions may be inhibited.

In the hardener contained in the far infrared radiation paint used for the steam generation apparatus according to the embodiment, it is possible to use silane compounds to increase the thermal conductivity. While the silane compound is not limited to a particular type, it is desirably composed of one of methyltrimethoxysilane, triethoxymethylsilane, methyltriisopropoxysilane, trimethoxyphenylsilane, triethoxyphenylsilane, dimethoxydimethylsilane, diethoxydimethylsilane, dimethoxydiphenylsilane, diethoxydiphenylsilane, tetramethyl orthosilicate, tetraethyl orthosilicate, and dimethoxymethylphenylsilanel, and more desirably methyltrimethoxysilane (MTMS) or tetramethyl orthosilicate (TMOS).

To be more specific on a coating method with the far infrared radiation paint used for the steam generation apparatus according to the embodiment, the far infrared paint is manufactured through a manufacturing process including the steps of: processing olivine into powder; agitating after adding a solvent agent and a binder; and adding a hardener to the agitated composition and agitating and allowing it to be cured. To be more specific with an example of coating by the far infrared radiation paint, the coating is made by sanding a surface of a material to be subjected to surface treatment to increase the bonding strength of the surface treatment, cleaning and drying the sanded material, spraying a coating agent onto the material and allowing it to be dried, and subjecting the dried material to thermal fusion at a high temperature of 750° C. in a high-temperature furnace.

Generated reactants obtained in the course of steam production in the steam generation apparatus according to the embodiment include oxygen, hydrogen, carbon, nitrogen, sodium, calcium, potassium, magnesium, manganese, phosphorus, silicon, boron, sulfur, chlorine, fluorine, zinc, cobalt, nickel, iron, aluminum, arsenic, and the like.

For cleaning the vaporizer 11 of the steam generation apparatus according to the embodiment, a high pressure nozzle equipped with a cleaning water supply device is attached to the upper flange 31 in communication with the inside of the vaporizer 11 and mounted such that cleaning water is injected at high pressure into the vaporizer 11. Cleaned wastewater is arranged to be discharged to the outside through the wastewater discharge port 45. At this time, the cleaning water injected into the vaporizer 11 also cleans the spiral groove 17 from the steam outlet port 44 via the steam channel 42.

Accordingly, removal of tar generated in the course of steam generation in the vaporizer 11 or foreign matters induced in the course of thermal catalysis is arranged for continuous use by performing cleaning processes.

Further, while the cleaning device for the vaporizer 11 is desirably composed of a cleaning water injection high pressure nozzle (not illustrated) and the wastewater discharge port 45, there may be a case in which it is modified to a flow channel other than that is indicated in the present invention or a case in which it is configured in an inverse cleaning method. Further, while description has been made as to the case in which the spiral groove 17 is formed in the outer wall of the vaporizer 11 in the embodiment described above, the spiral groove may be formed in an inner wall surface of the vaporizer housing 21 or the spiral channel may be formed with a spiral-shaped member interposed between the vaporizer 11 and the vaporizer housing 21. It is obvious from claims that any form with such a modification or improvement may be encompassed in the technical scope of the present invention.

REFERENCE SIGNS LIST

10: base
11: vaporizer
12: injection nozzle
13: solenoid valve
14: outlet port
15: check valve
16: discharge port
17: spiral groove
21: vaporizer housing
22: upper collar
23: lower collar
31: upper flange
32: lower flange
41: steam socket
42: steam channel
43: steam inlet port
44: steam outlet port
45: wastewater discharge port
46: heater fixture
51: gasket
61: heater

The invention claimed is:

1. A steam generation apparatus comprising:
a vaporizer housing including a cylindrical part having a predetermined diameter and length, axial opposite ends of the vaporizer housing being opened, and collars formed at axial opposite ends of the cylindrical part;
an upper flange and a lower flange to be joined to respective one of the collars of the vaporizer housing;
a vaporizer having a cylindrical shape with axial opposite ends being opened, the vaporizer being housed within the cylindrical part of the vaporizer housing with a spiral channel in between;
at least one exothermic member disposed such that an inside of the vaporizer is heated to a predetermined temperature;
an injection nozzle located at a center of the upper flange and including an intake for liquid to be treated and a solenoid valve;
a steam socket that is a member attached to the lower flange for guiding steam produced in the vaporizer to the spiral channel, the steam socket including a steam inlet port connected to an inside of the vaporizer, a steam outlet port connected to the spiral channel, and a steam channel connecting the steam inlet port and the steam outlet port; and
a wastewater discharge port passing through both the lower flange and the steam socket.

2. The steam generation apparatus according to claim 1, wherein
the spiral channel is a spiral groove formed in an outer wall of the vaporizer.

3. The steam generation apparatus according to claim 1, wherein
the spiral channel is a spiral groove formed in an inner wall of the vaporizer housing.

4. The steam generation apparatus according to claim 1, wherein
the spiral channel includes a spiral-shaped member such that the steam rises windingly along the vaporizer and flows out to an outside.

5. The steam generation apparatus according to claim 1, wherein
the liquid to be treated includes seawater and a thermal catalyzer.

6. The steam generation apparatus according to claim 1, wherein
inner and outer circumferential surfaces of the vaporizer and an inner circumferential surface of the vaporizer housing are subjected to surface treatment including a far infrared radiation paint.

* * * * *